Oct. 13, 1953          JB JOHNSON          2,655,009
REFRIGERATION SYSTEM FOR VEHICLES
Filed Nov. 17, 1949
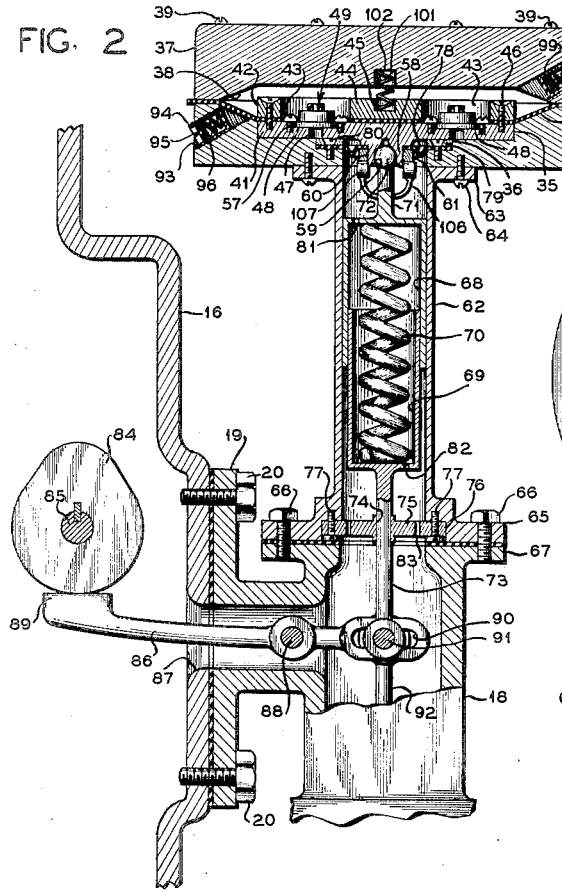
INVENTOR.
JB JOHNSON
BY
*A. Yates Dowell*
ATTORNEY Patented Oct. 13, 1953

2,655,009

UNITED STATES PATENT OFFICE 2,655,009

REFRIGERATION SYSTEM FOR VEHICLES

JB Johnson, Tyler, Tex., assignor of twenty-four per cent to Wilford C. Thompson and twenty-four per cent to Pickens Morris, both of Tyler, Tex.

Application November 17, 1949, Serial No. 127,920

2 Claims. (Cl. 62—117)

1

This invention relates to refrigeration systems and more particularly to such a system specifically adapted for incorporation in a motor vehicle to cool the passenger compartment.

Heretofore, numerous refrigeration systems for use in motor vehicles have been developed and marketed but many of these were relatively large complicated and cumbersome affairs located in the luggage compartment of the vehicle and occupied a large amount of such space. This rendered it difficult to accommodate a sufficient quantity of baggage on a long trip and likewise these prior systems included complicated piping and flexible tubing arrangements which, due to the ever present vibration in the motor vehicle, were a continuous source of annoyance and maintenance troubles. Further, these prior systems were relatively expensive both to install and maintain and the power requirements were such that the normal battery and electrical system of the automobile was subjected to a severe overload.

It is, accordingly, an object of this invention to provide a refrigeration system particularly adapted for installation in a motor vehicle, which system occupies a minimum of space, utilizes a power take off already provided on the motor, and may conveniently utilize the conventional heater already installed in the vehicle as a cooling unit.

It is a further object of this invention to provide a refrigeration system for use in a motor vehicle, which system incorporates a novel diaphragm type compressor, which compressor includes safety features to prevent damage thereto in the event the compressor becomes filled with relatively incompressible liquid during periods of non-use.

It is a further object of this invention to provide a refrigeration system for incorporation in a motor vehicle, which system utilizes a diaphragm type compressor and in which there is provided a novel control means for rendering the compressor inoperative or for varying the output capacity thereof between zero and maximum.

It is a further object of this invention to provide a refrigeration system particularly adapted for use in a motor vehicle which is of extremely simple and economical construction and which may be installed in the vehicle by relatively unskilled labor resulting in a cooling unit which is readily available to a large majority of motor vehicle owners.

Further objects and advantages of the invention will be apparent from the following specification taken in conjunction with the accompanying drawings, wherein:

Fig. 1 is a fragmentary diagrammatic view showing the forward portion of a motor vehicle with the refrigeration system of this invention installed therein;

Fig. 2, a fragmentary longitudinal sectional view showing the internal structure of the diaphragm type compressor and the manner of supporting and driving the same from the engine of the motor vehicle;

Fig. 3, a top plan view of the compressor shown in Fig. 2 with the cover plate removed;

Fig. 4, a fragmentary view with parts in section for greater clarity showing a portion of the compressor drive mechanism and associated control means; and, Fig. 5, a sectional view showing the details of one of the valves incorporated in the diaphragm of the compressor.

With continued reference to the drawings there is shown diagrammatically in Fig. 1, the forward portion of a motor vehicle comprising a hood 10, radiator 11, cooling fan 12, motor 13, steering wheel 14, and instrument panel 15. The motor 13 includes the usual cylinder block 16 upon which is mounted the conventional fuel pump 17 secured to a casting 18 provided with a flange 19 secured to the motor block 16 by screw threaded fastening means or the like 20.

The refrigeration system of this invention includes a diaphragm type compressor 21 having a discharge or high pressure line 22 leading to a condenser 23 positioned in such a manner as to receive a continuous flow of air from the cooling fan 12. If desired, for ease of installation or increased efficiency the condenser 23 may be positioned between the radiator 11 and grill 11'. From the condenser 23 a conduit 24 leads to a liquid refrigerant receiver 25 from which a liquid line 26 communicates with an evaporator 27 which may conveniently take the form of the conventional hot water heater normally installed on the fire wall in motor vehicles. If desired, however, a specially designed evaporator may be utilized instead of the hot water heater and in some instances would result in increased efficiency. From the evaporator 27 a suction line 28 leads to the suction side of the compressor 21. Also disposed in the liquid line 26 is an expansion valve 29 the operation of which is controlled by a conventional heat responsive bulb 30 in contact with the liquid line adjacent the evaporator 27 and connected by a tube 31 with the valve 29.

In order to insure a rapid circulation of air over the evaporator 27 there may be provided a motor driven fan 32 which blows air therethrough, this fan receiving air from the interior of the vehicle and projecting the same through the coil of the evaporator 27 to produce a cooling thereof and a consequent reduction of temperature within the passenger compartment of the vehicle. If desired, the speed of the fan 32 may be controlled by the usual switch, not shown, mounted on the instrument panel 15 for this purpose.

The diaphragm type compressor 21 utilized in this refrigeration system is of novel construction and includes a main compressor body 33 which may be conveniently constructed in the form of a relatively thick circular plate, although this body may be of any form desired. Body 33 is provided in its upper face with a recess having an angularly disposed peripheral wall 34, the central portion of the body 33 being counter-bored at 35 and 36 for a purpose to be presently described. A cover plate 37 is provided with a frusto-conical recess 38 in its lower face which together with the recess in the body 33 constitutes the compressor chamber. Cover plate 37 is adapted to be positioned on the body 33 and be secured thereto by screw threaded fastening means or the like 39. A diaphragm 40 of suitable flexible material is clamped between body 33 and cover plate 37 adjacent the periphery thereof, this diaphragm extending completely across the compressor chamber and being clamped to a reciprocating valve plate 41 by a clamping plate 42 provided with a plurality of apertures 43 and a central portion 44 having a recess 45 therein for a purpose to be presently described. Clamping plate 42 is fastened to the valve plate 41 by a plurality of screw threaded fastening means or the like 46.

Valve plate 41 is provided with a plurality of apertures 47 terminating in counterbores 48 adjacent the upper surface of the plate. Positioned in each of the counterbores is a valve 49 shown in detail in Fig. 5.

Valve 49 comprises a stamped sheet metal body 50 of stepped construction, there being a plurality of slots or apertures 51 therein to permit the passage of fluid through the valve. Valve body 50 is so formed as to provide a centrally located aperture 52, the side wall of which terminates inwardly of the body 50 to provide a valve seat 53. Positioned upon this seat is a valve member 54 in the form of a disc which is normally held in engagement with the seat 53 by a compression spring 55 engaging the valve member 54 and the body 50. A portion of the body 50 provides an annular flange 56 which may be conveniently utilized to secure the valve 49 in position in the valve plate 41. This operation is accomplished by setting the valve 49 in the counterbore 48, there being a plurality of screw threaded fasteners or the like 57 positioned around the counterbore with a portion of each head of the fasteners 57 engaging the flange 56 and the upper surface of the plate 41 to securely clamp the valve 49 in position within the counterbore 48.

Valve plate 41 is provided on its lower surface with a centrally located circular boss 58 having generally hemispherical recesses 59 therein, the outer surface of the boss 58 being provided with a taper threaded portion 60 adapted to receive a taper threaded nut 61. This structure provides a convenient means for attaching the diaphragm 40, valve plate 41, and clamping plate 42 to the drive mechanism to be presently described.

In order to conveniently mount or support the compressor body 33 and associated parts and also to house the driving mechanism there may be provided a tubular member 62 having a flange 63 at one end secured to compressor body 33 by screw threaded fastening means or the like 64. The opposite end of tubular member 62 terminates in a flange 65 which may be conveniently secured by screw threaded fastening means 66 to flange 67 provided on casting 18.

The novel drive mechanism incorporated in this compressor comprises a cup shaped cylindrical member 68 slidably received within the tubular member 62, cylindrical member 68 also slidably receiving a second cup shaped cylindrical member 69 to provide a telescoping assembly. Positioned within the members 68 and 69 and in engagement with their end walls is a compression spring 70 which serves to transmit compressive force from member 69 to member 68.

Member 68 is provided with an axially extending rod like portion 71 terminating in a ball 72 received in the hemispherical recesses 59 in boss 58. Ball 72 is loosely clamped in position by taper threaded nut 61 to provide a ball and socket joint.

Cylindrical member 69 terminates at its lower end in an axially extending rod like portion or element 73 which is slidably received in an aperture 74 in closure plate 75 which may be secured in place in a counterbore 76 in the flange 65 by screw threaded fastening means 77. Aperture 74, together with the cylindrical inner wall of the tubular member 62 provides a guide means for the drive assembly. However, close manufacturing tolerances need not be maintained for these parts since all that is necessary is a relatively loose sliding fit.

In order to prevent leakage between the compressor chamber and the interior of tubular member 62, a sealing diaphragm 78 may be clamped in counterbore 36 in compressor body 33 by a clamping plate 79 secured by screw threaded fastening means or the like 80. Sealing diaphragm 78 is provided with a centrally located aperture received over the boss 58 and is clamped in position thereon by taper threaded nut 61. This structure provides an effective seal between the compressor chamber and the interior of tubular member 62 and prevents any leakage of fluid therebetween.

In order to vent any fluid pressure which may build up within the telescoping cup shaped members 68 and 69 and also to permit the introduction of lubricant thereto, member 68 may be provided with a vent opening 81 and member 69 with a vent opening 82. Likewise closure plate 75 may be provided with vent openings 83 whereby lubricant may be introduced into the assembly and fluid pressure vented therefrom.

The above described compressor may be conveniently driven by the conventional drive mechanism utilized to operate the fuel pump 17. This mechanism comprises a cam 84 mounted on the cam shaft 85 of the engine 13 and a rocker arm 86 extending through an aperture 87 in the engine block 16, the rocker arm 86 being pivotally mounted at 88 on the casting 18. The inner end of rocker arm 86 is provided with a cam follower 89 in engagement with the surface of the cam 84 and the opposite end of rocker arm 86 is provided with an elongated slot 90 through which passes a pin 91 serving to connect rod 73 and rod 92 which is connected to the fuel pump 17. As will be seen from an inspection of Fig. 2, upon rotation of the cam shaft 85 the cam 84 will cause the rocker arm 86 to oscillate about pivot 88 thus reciprocating pin 91 and rods 73 and 92 attached thereto which results in actuation of the fuel pump 17 and the above described compressor in a manner to be presently described.

The suction chamber of the compressor of this invention is provided by the recess in the body 33 and in order to permit the flow of fluid thereto there is provided a screw threaded bore 93 which may threadedly receive an inlet valve 94. Valve 94 is provided with a valve member 95 which is normally urged to closed position by a compression spring 96. However, upon upward movement of the diaphragm 40 to create a vacuum within the suction chamber, the pressure of fluid on the outer surface of valve member 95 will move the same inwardly against the action of spring 96 thus permitting the flow of fluid to the suction chamber.

The recess 38 in the cover plate 37 provides a compression chamber and in order to conduct compressed fluid therefrom there is provided in the cover plate 37 a screw threaded bore 97 in which is threadedly received an outlet valve 98. Valve 98 is provided with a valve member 99 which is normally held in closed position by a compression spring 100, this valve preventing flow of fluid from the exterior of the compressor into the compression chamber but operating against the action of spring 100 to permit the flow of compressed fluid therefrom.

In order to insure return of the diaphragm 40 and associated parts to lowermost position there is provided a return spring 101 with one end positioned in recess 45 in clamping plate 42 and with the opposite end positioned in a recess 102 in cover plate 37.

In operation the reciprocatory movement of rod 73 will be transmitted in one direction to cup shaped member 68 by compression spring 70 which will serve to move the valve plate 41, diaphragm 40, and clamping plate 42 upwardly in the compressor chamber to compress fluid above the diaphragm and force the same outwardly through outlet valve 98. At the same time a partial vacuum will be created below the diaphragm 40 causing fluid to flow into the suction chamber through valve 94. Upon return movement of the diaphragm 40 under the action of spring 101 the valve members 54 in valves 49 will open against the action of springs 55 to allow fluid in the suction chamber to flow upwardly through slots 51 into the compression chamber thus recharging the same with fluid to permit reciprocation of the compression cycle.

Obviously the compression spring 70 may be so calibrated that the pressure developed in the compressor chamber will be governed thereby since if such pressure exceeds the compression strength of spring 70 this spring will yield and the diaphragm and associated parts will remain stationary until cup shaped member 69 returns to its lowermost position at which time return spring 101 will return the diaphragm to its lowermost position. This structure determines the maximum pressure developed by the compressor and also affords a safety device in the event the compression chamber becomes filled or partially filled with liquid or other comparatively incompressible fluid whereby a positive movement of the diaphragm would result in damage to the parts with possible rupture of the diaphragm or breakage of associated elements.

Since it is often desirable to discontinue operation of the compressor without stopping the engine and also since it is sometimes desirable to vary the capacity of the compressor, a simple, efficient and novel control mechanism is provided which is shown in detail in Fig. 4.

This control mechanism comprises a bell crank lever 102' which may be conveniently pivoted at 103 on ears 104 extending from the wall of the tubular member 62, a portion of the bell crank lever 102' extending through an aperture 105 in the wall of the tubular member. The inner end of the bell crank lever 102' is provided with a yoke 106, the arms thereof being disposed on each side of the extension 71, the yoke arms terminating in enlarged portions 107 providing bearing surfaces to engage the lower surface of taper threaded nut 61. The opposite end of bell crank lever 102' is provided with an apertured portion 108 adapted to receive an operating or control wire 109 which is clamped in position by a screw threaded fastening means or the like 110. The control wire 109 may extend through a flexible sheath 111 to a point convenient to the operator, the wire 109 being provided with a finger engaging knob 112' which may be utilized for controlling operation of the compressor. Sheath 111 may be secured in position by one or more sheet metal clips 112 fixed in place by screw threaded fastening means or the like 113.

Upon operation of control wire 109 to rotate the bell crank lever 102' clockwise as viewed in Fig. 4 the enlarged portion 107 will bear against the nut 61 and raise the diaphragm 40 and associated parts to uppermost position thereby preventing reciprocation of the same under the action of rod 73 and compression spring 70. This will result in reducing the compressor capacity to zero and the compressor will remain in inoperative condition until wire 109 is actuated to move bell crank lever 102' in counterclockwise direction whereupon diaphragm 40 and associated parts will be reciprocated through a path of travel depending upon the position of enlarged portion 107. If the movement of the bell crank lever 102' is sufficient to move the enlarged portion 107 entirely out of contact with nut 61 then the diaphragm 40 and associated parts will move through their full path of travel and the compressor will deliver its maximum capacity whereas if the enlarged portion 107 occupies some intermediate position this will serve to block downward movement of the nut 61 and diaphragm 40 whereby the path of travel will be some intermediate value between maximum and zero. This structure results in providing an infinite variation in the capacity of the compressor between zero and maximum and frictional means, not shown, is provided in the control system to retain the bell crank lever 102 and enlarged portion 107 in the desired position.

Obviously, various modifications of this control mechanism may be employed such as a cam in engagement with the nut 61, the cam having a proper contour to accomplish the desired variation in diaphragm movement. The basic principle, however, would be the same regardless of what specific mechanism was employed and the structure disclosed in Fig. 4 is by way of illustration only.

The refrigeration system shown in Fig. 1 operates in a conventional manner, the compressor 21 serving to compress the refrigerant and discharge the same through line 22 to condenser 23 wherein the gaseous refrigerant is condensed to a liquid, the liquid flowing through line 24 to liquid receiver 25. As required, the liquid refrigerant flows from receiver 25 through line 26 and expansion valve 29 into the evaporator 27 where the liquid refrigerant is converted to a gas and in this process absorbs heat from the air passing around the coils of the evaporator 27 under the action of fan 32. The gasified refrigerant in the evaporator is then drawn off through suction line 28 to the suction chamber of the compressor 21.

The operation of the refrigeration system may be controlled through the medium of bell crank lever 102, control wire 109, and finger engaging knob 112, this control acting to stop the compressor reciprocation whether the engine 13 is running or not, this control also being operable to vary the capacity of the compressor for any desired output between zero and maximum.

The drive mechanism includes the compression spring 70 and associated parts and is particularly valuable in this application since during periods of non use liquid refrigerant tends to collect within the compressor chamber and consequently if the diaphragm were actuated by a positive drive there would be extreme likelihood of severe damage to the parts if not actual breakage of the compressor casting. The spring 70 allows the driving mechanism to yield without damage to the parts until such time as the liquid within the compressor chamber has drained therefrom at which time the compressor will commence normal operation.

The driving mechanism also provides a very efficient safety device in that the compression spring may be calibrated for the maximum pressure desired and consequently under abnormal conditions there would be no danger of the pressure within the refrigeration system reaching a dangerous value since the maximum pressure obtainable would be that determined by the compression strength of the spring 70. Such a safety device is particularly desirable in an installation of this sort where the speed of the engine 13 varies over a wide range and if operated for a considerable period of time at a relatively high rate of speed abnormal pressures might build up in the refrigeration system. This situation could of course be controlled by proper actuation of the knob 112' but rather than depend on the skill of the operator the spring 70 serves to eliminate any danger from this source, if the operator does forget to properly adjust knob 112'.

It will be seen that by the above described invention there has been provided a relatively simple yet highly efficient refrigeration system particularly adapted for installation in a motor vehicle where space is at a premium and in which adequate control and safety devices have been incorporated, the compressor utilized in the system being of a particularly inexpensive yet highly efficient type and being adapted to be easily installed in the motor vehicle by relatively unskilled labor thereby resulting in a relatively inexpensive device and one which requires relatively little maintenance or upkeep.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A refrigeration system for motor vehicles including a compressor, a condenser, a liquid refrigerant receiver, an expansion valve, and an evaporator connected by conduits, said compressor comprising a body and a cover member recessed to provide a compressor chamber, a diaphragm within said chamber, a support for said compressor comprising a tubular member secured to the body, means for reciprocating said diaphragm comprising a first cup-shaped member slidably disposed in said tubular member, a second cup-shaped member telescopically received within said first cup-shaped member, a calibrated compression spring disposed within said cup-shaped members, means connecting said first cup-shaped member and said diaphragm, means for connecting said second cup-shaped member to power means whereby said diaphragm may be reciprocated by said spring the pressure developed in said chamber and in said refrigeration system being dependent upon the compression strength of said spring.

2. A refrigeration system for motor vehicles including a compressor, a condenser, a liquid refrigerant receiver, an expansion valve, and an evaporator connected by conduits, said compressor including a diaphragm and yieldable means for reciprocating the same and a control means for said compressor comprising a pivotally mounted bell crank lever one end thereof terminating in a yoke, enlarged bearing portions upon said yoke constructed and arranged to engage said diaphragm, a control wire secured to the opposite end of said bell crank lever whereby upon operation of said control wire to pivot said bell crank lever said bearing portions will engage said diaphragm to permit limited movement thereof, said control means being effective to control the capacity of said compressor between zero and maximum whereby the refrigerating effect of said system may be controlled.

JB JOHNSON.

References Cited in the file of this patent
UNITED STATES PATENTS

| Number | Name | Date |
|---|---|---|
| 2,078,804 | McConkey | Apr. 27, 1937 |
| 2,162,512 | McPherson et al. | June 13, 1939 |
| 2,199,090 | Palmer | Apr. 30, 1940 |
| 2,256,237 | Broden | Sept. 16, 1941 |
| 2,256,987 | Meyerhoffer | Sept. 23, 1941 |
| 2,276,568 | Erickson | Mar. 17, 1942 |